United States Patent
Gangumalla et al.

(10) Patent No.: US 11,869,025 B2
(45) Date of Patent: Jan. 9, 2024

(54) CHARGING INFRASTRUCTURE AND REMOTE COMPUTING SYSTEM FOR ELECTRIC VEHICLE COMPUTING NODE

(71) Applicant: GM Global Technology Operations LLC, Detroit, MI (US)

(72) Inventors: Aravind Gangumalla, Novi, MI (US); Anil K. Sachdev, Rochester Hills, MI (US); Anil Bika, Rochester Hills, MI (US); Nathan Thompson, Sterling Heights, MI (US); Ramesh Sethu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/741,546

(22) Filed: May 11, 2022

(65) Prior Publication Data
US 2023/0368235 A1    Nov. 16, 2023

(51) Int. Cl.
*G06Q 30/0208* (2023.01)
*G06Q 30/0251* (2023.01)
*B60L 53/64* (2019.01)
*B60L 53/66* (2019.01)

(52) U.S. Cl.
CPC .......... *G06Q 30/0208* (2013.01); *B60L 53/64* (2019.02); *B60L 53/665* (2019.02); *G06Q 30/0265* (2013.01)

(58) Field of Classification Search
None
See application file for complete search history.

(56) References Cited

U.S. PATENT DOCUMENTS

| | | | |
|---|---|---|---|
| 9,371,007 B1* | 6/2016 | Penilla | G06Q 30/0259 |
| 2021/0303343 A1* | 9/2021 | Gusikhin | B60L 53/66 |
| 2022/0169140 A1* | 6/2022 | Yang | B60L 53/66 |
| 2022/0394557 A1* | 12/2022 | Falla Cepeda | H04L 9/3236 |

OTHER PUBLICATIONS

G. Qiao, S. Leng, K. Zhang and Y. He, "Collaborative Task Offloading in Vehicular Edge Multi-Access Networks," in IEEE Communications Magazine, vol. 56, No. 8, pp. 48-54, Aug. 2018, doi: 10.1109/MCOM.2018.1701130. (Year: 2018).*
K. Zhang, Y. Mao, S. Leng, S. Maharjan and Y. Zhang, "Optimal delay constrained offloading for vehicular edge computing networks," 2017 IEEE International Conference on Communications (ICC), Paris, France, 2017, pp. 1-6, doi: 10.1109/ICC.2017.7997360. (Year: 2017).*

* cited by examiner

*Primary Examiner* — Katherine Kolosowski-Gager
(74) *Attorney, Agent, or Firm* — Vivacqua Crane PLLC

(57) ABSTRACT

A method for using idle computing power of an electric vehicle includes sending the computing tasks and the task rates for performing the computing tasks to a vehicle controller of the electric vehicle and receiving an acceptance signal from the vehicle controller. The acceptance signal is indicative that the vehicle controller accepted to perform the computing tasks. The method further includes commanding a charging infrastructure to supply electrical power the electric vehicle while the vehicle controller performs the computing tasks.

20 Claims, 7 Drawing Sheets

CHARGING INFRASTRUCTURE AND REMOTE COMPUTING SYSTEM FOR ELECTRIC VEHICLE COMPUTING NODE

INTRODUCTION

The present disclosure relates to a charging infrastructure and a remote computing system for an electric vehicle computing node.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

In certain situations, computing power is needed to perform computing tasks. It is therefore desirable to identify computing devices with idle computing power that can perform those computing tasks.

SUMMARY

The present disclosure describes a charging infrastructure and a remote computing system for an electric vehicle computing node. When the electric vehicle is used as computing node, the presently disclosed charging infrastructure supplies electrical power to the electric vehicle at the same time as the electric vehicle performs computing tasks received from a remote computing system, such as a cloud computing system or a grid computing system. The present disclosure also describes a method that allows idle computing power in the electric vehicle to be used for other applications, such as parallel, distributed, edge, and blockchain applications. The idle computing power of the electric vehicle may be sold, thereby offsetting the cost of owning the electric vehicle.

In an aspect of the present disclosure, a method for using idle computing power of an electric vehicle includes sending the computing tasks and the task rates for performing the computing tasks to a vehicle controller of the electric vehicle and receiving an acceptance signal from the vehicle controller. The acceptance signal is indicative that the vehicle controller accepted to perform the computing tasks. The method further includes commanding a charging infrastructure to supply electrical power the electric vehicle while the vehicle controller performs the computing tasks in response to receiving the acceptance signal from the vehicle controller. The method described in this paragraph improves vehicle technology and computing technology by using idle computing power available in electric vehicle for other applications, such as parallel, distributed, edge, and blockchain applications.

In an aspect of the present disclosure, the method further includes receiving the task rates for performing the computing tasks from a remote server. The vehicle controller sends the acceptance signal to a station controller of the charging infrastructure based on the task rates for performing the computing tasks.

In an aspect of the present disclosure, the method further includes communicating charge rates for electrically charging the vehicle controller to the vehicle controller.

In an aspect of the present disclosure, the method further includes communicating advertisements to the vehicle controller. The advertisements include at least one chosen from discounts, promotions, and seasonal adjustments. The discounts include charge rate discounts in exchange for using the idle computing power of the vehicle controller.

In an aspect of the present disclosure, a method for using idle computing power of an electric vehicle includes creating task packets. Each of the task packets includes a plurality of computing tasks and corresponding task rates for each of the plurality of computing tasks. The method further includes sending the computing tasks to a vehicle controller of the electric vehicle and, in response to sending the computing tasks to the vehicle controller of the electric vehicle, receiving results of a performance of the computing tasks by the vehicle controller while a charging infrastructure supplies electrical power to the electric vehicle.

In an aspect of the present disclosure, the method further includes billing a vehicle operator of the electric vehicle for supplying electrical power to the electric vehicle while providing a discount for using a computing power of the vehicle controller to perform the computing tasks.

In an aspect of the present disclosure, the method further includes scheduling the performance of the computing tasks by the vehicle controller.

In an aspect of the present disclosure, the method further includes determining that the computing tasks of at least one of the task packets have been completed by the vehicle controller and purging the computing tasks that have been completed from the task packets.

In an aspect of the present disclosure, a remote server creates task packets, sends the task packets to the vehicle controllers through a charge port of the electric vehicle, and receives results of the performance of the computing tasks by the vehicle controller.

In an aspect of the present disclosure, a system for using idle computing power of an electric vehicle includes a charging infrastructure including a station controller. The station controller is programmed to: receive computing tasks from a remote server; send the computing tasks to a vehicle controller of the electric vehicle; and receive an acceptance signal from the vehicle controller. The acceptance signal is indicative that the vehicle controller accepted to perform the computing tasks. The station controller is further programmed to command the charging station to electrical charge the electric vehicle while the vehicle controller performs the computing tasks in response to receiving the acceptance signal from the vehicle controller.

In an aspect of the present disclosure, the station controller is programmed to receive task rates for performing the computing tasks from the remote server. The vehicle controller is programmed to send the acceptance signal to the station controller of the charging station based on the task rates for performing the computing tasks.

In an aspect of the present disclosure, the station controller is programmed to communicate charge rates for electrically charging the vehicle controller to the vehicle controller.

In an aspect of the present disclosure, the station controller is programmed to communicate advertisements to the vehicle controller. The advertisements include at least one chosen from discounts, promotions, and seasonal adjustments. The discounts include charge rate discounts in exchange for using the idle computing power of the vehicle controller.

In an aspect of the present disclosure, the system further includes the remote server. The remote server includes a server controller. The server controller is programmed to create task packets. Each of the task packets includes computing tasks and corresponding task rates for each of the computing tasks. The server controller is programmed to: send the computing tasks to the vehicle controller of the electric vehicle; and in response to sending the computing tasks to the vehicle controller of the electric vehicle, receive results of a performance of the computing tasks by the vehicle controller while the charging station supplies electrical power to the electric vehicle.

In an aspect of the present disclosure, the server controller is programmed to bill a vehicle operator of the electric vehicle for the electrically charging the electric vehicle while providing a discount for using a computing power of the vehicle controller to perform the computing tasks.

In an aspect of the present disclosure, the server controller is programmed to schedule the performance of the computing tasks by the vehicle controller.

In an aspect of the present disclosure, the server controller is programmed to: determine that the computing tasks of at least one of the task packets have been completed by the vehicle controller; and purge the computing tasks that have been completed from the task packets.

In an aspect of the present disclosure, the remote server wirelessly sends the computing tasks to the vehicle controllers and receives results of the performance of the computing tasks by the vehicle controller.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
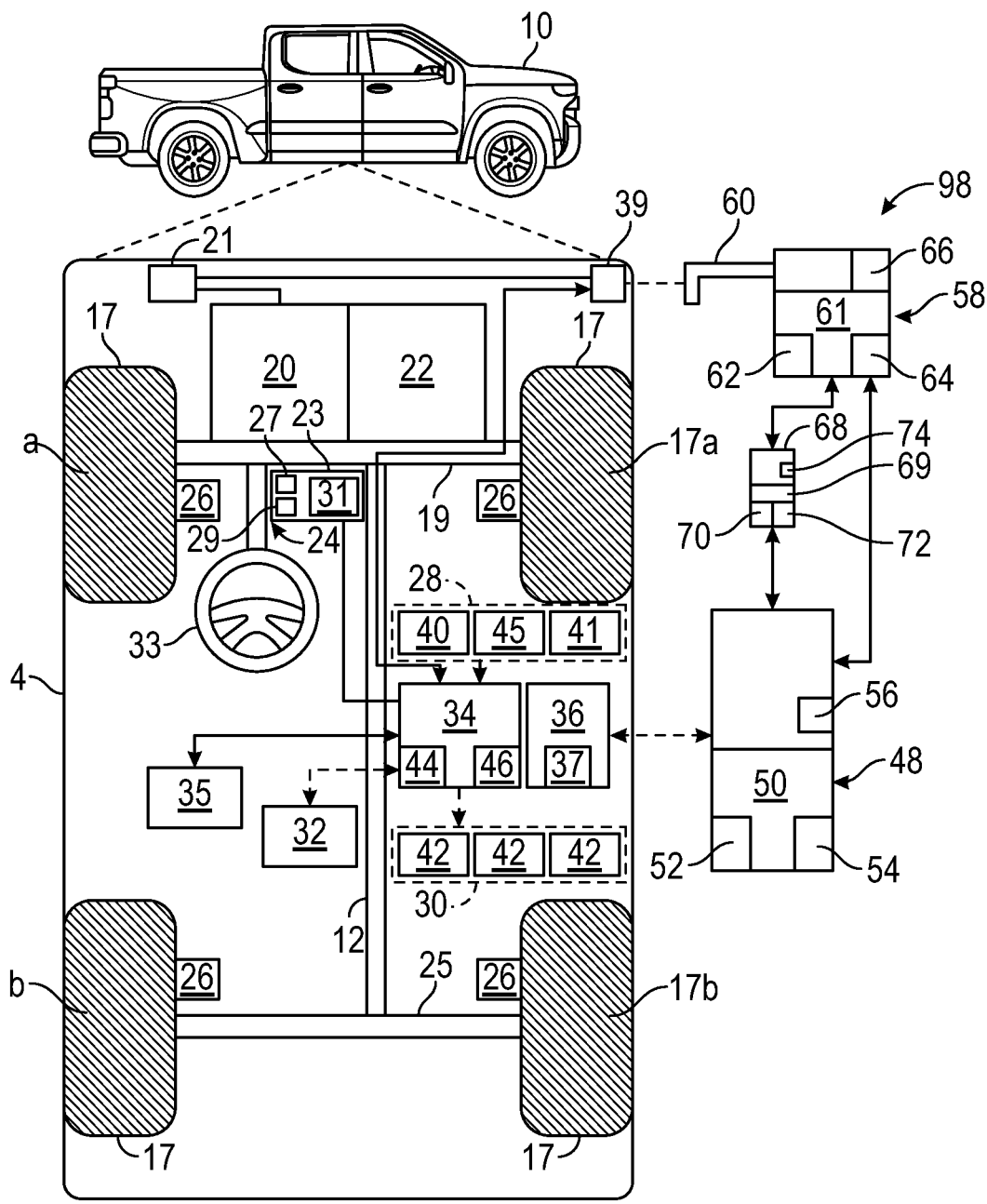
FIG. 1 is a block diagram depicting an embodiment of an electric vehicle, which is part of a system for using idle computing power of an electric vehicle.

Reference will now be made in detail to several examples of the disclosure that are illustrated in accompanying drawings. Whenever possible, the same or similar reference numerals are used in the drawings and the description to refer to the same or like parts or steps.

FIG. 1 schematically illustrates an electric vehicle 10, such as a battery electric vehicle (BEV) or a plug-in hybrid electric vehicle (PHEV). The electric vehicle 10 generally includes a chassis 12, a body 14, front and rear wheels 17 and may be referred to as a vehicle system. In the depicted embodiment, the electric vehicle 10 includes two front wheels 17a and two rear wheels 17b. The body 14 is arranged on the chassis 12 and substantially encloses components of the electric vehicle 10. The body 14 and the chassis 12 may jointly form a frame. The wheels 17 are each rotationally coupled to the chassis 12 near a respective corner of the body 14. The electric vehicle 10 includes a front axle 19 coupled to the front wheels 17a and a rear axle 25 coupled to the rear wheels 17b.

In various embodiments, the electric vehicle 10 may be an autonomous vehicle and may be part of a system 98 for using idle computing power of the electric vehicle 10. The electric vehicle 10 is, for example, a vehicle that is automatically controlled to carry passengers from one location to another. The electric vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the electric vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the electric vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the electric vehicle 10 generally includes a propulsion system 20, a steering system 24, a brake system 26, a sensor system 28, an actuator system 30, at least one data storage device 32, at least one vehicle controller 34, and a communication system 36. The propulsion system 20 may, in various embodiments, include an electric machine such as a traction motor and/or a fuel cell propulsion system. The electric vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine and/or an electric motor. The electric vehicle 10 may include a transmission system 22 if the propulsion system 20 includes an internal combustion engines. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the electric vehicle 10. The sensors 40 are in communication with the vehicle controller 34 and may include, but are not limited to, one or more radars, one or more light detection and ranging (lidar) sensors, one or more proximity sensors, one or more odometers, one or more ground penetrating radar (GPR) sensors, one or more steering angle sensors, one or more global positioning systems (GPS) transceivers 45, one or more tire pressure sensors, one or more cameras 41 (e.g., optical cameras and/or infrared cameras), one or more gyroscopes, one or more accelerometers, one or more inclinometers, one or more speed sensors, one or more ultrasonic sensors, one or more inertial measurement units (IMUs) and/or other sensors. Each sensor 40 is configured to generate a signal that is indicative of the sensed observable conditions of the exterior environment and/or the interior environment of the electric vehicle 10. Because the sensor system 28 provides data to the vehicle controller 34, the sensor system 28 and its sensors 40 are considered sources of information (or simply sources).

The sensor system 28 includes one or more Global Navigation Satellite System (GNSS) transceivers 45 (e.g., Global Positioning System (GPS) transceivers) configured to detect and monitor the route data (i.e., route information). The GNSS transceiver 45 is configured to communicate with a GNSS to locate the position of the electric vehicle 10 in the globe. The GNSS transceiver 45 is in electronic communication with the vehicle controller 34.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the electric vehicle 10. In various embodiments, the data storage device 32 stores defined maps of the navigable environment. In various embodiments, the defined maps may be predefined by and obtained from a remote system. For example, the defined maps may be assembled by the remote system and communicated to the electric vehicle 10 (wirelessly and/or in a wired manner) and stored in the data storage device 32. The data storage device 32 may be part of the vehicle controller 34, separate from the vehicle controller 34, or part of the vehicle controller 34 and part of a separate system.

The electric vehicle 10 may further include one or more airbags 35 in communication with the vehicle controller 34 or another controller of the electric vehicle 10. The airbag 35 includes an inflatable bladder and is configured to transition between a stowed configuration and a deployed configuration to cushion the effects of an external force applied to the electric vehicle 10. The sensors 40 may include an airbag sensor, such as an IMU, configured to detect an external force and generate a signal indicative of the magnitude of such external force. The vehicle controller 34 is configured to command the airbag 35 to deploy based on the signal from one or more sensors 40, such as the airbag sensor. Accordingly, the vehicle controller 34 is configured to determine when the airbag 35 has been deployed.

The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 may be implemented using a number of memory devices such as PROMs (programmable read-only memory), EPROMs (electrically PROM), EEPROMs (electrically erasable PROM), cloud storage, flash memory, or another electric, magnetic, optical, or combination memory devices capable of storing data, some of which represent executable instructions, used by the vehicle controller 34 in controlling the electric vehicle 10. The vehicle controller 34 of the electric vehicle 10 may be programmed to execute at least part of the methods described in detail below.

The instructions may include one or more separate programs, each of which comprises an ordered listing of executable instructions for implementing logical functions. The instructions, when executed by the vehicle processor 44, receive and process signals from the sensor system 28, perform logic, calculations, methods and/or algorithms for automatically controlling the components of the electric vehicle 10, and generate control signals to the actuator system 30 to automatically control the components of the electric vehicle 10 based on the logic, calculations, methods, and/or algorithms. Although a single vehicle controller 34 is shown in FIG. 1, embodiments of the electric vehicle 10 may include a plurality of vehicle controllers 34 that communicate over a suitable communication medium or a combination of communication mediums and that cooperate to process the sensor signals, perform logic, calculations, methods, and/or algorithms, and generate control signals to automatically control features of the electric vehicle 10.

Figure 6:
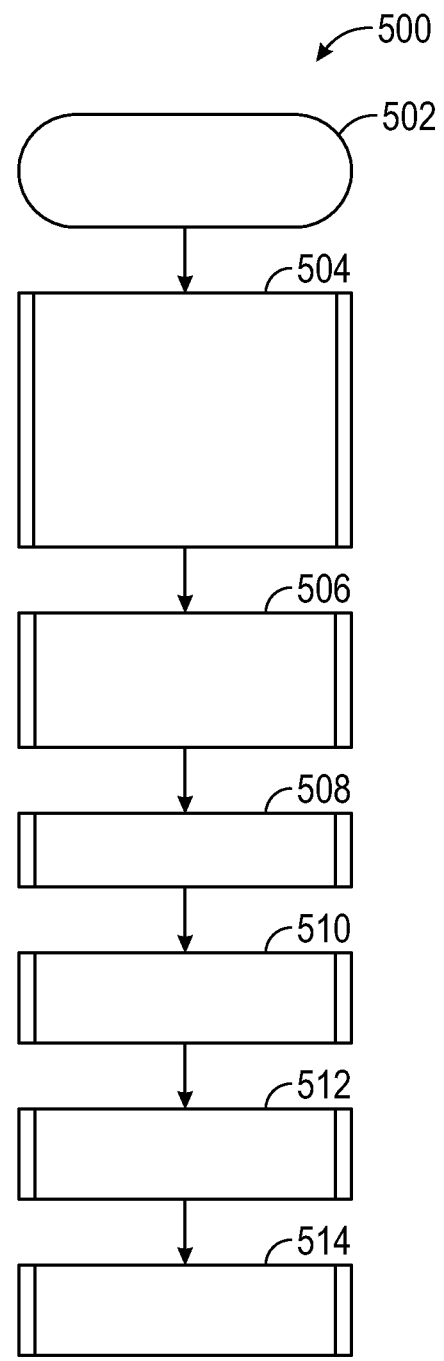
FIG. 6 is a flowchart of a process for using the electric vehicle as a computing node from the perspective of the remote computing system, wherein this process is part of the method for using idle computing power of the electric vehicle of FIG. 3.

In various embodiments, one or more instructions of the vehicle controller 34 are embodied in the control system 98. The electric vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the electric vehicle 10. The user interface 23 is in electronic communication with the vehicle controller 34 and is configured to receive inputs by a user (e.g., a vehicle operator or a vehicle passenger). For example, the user interface 23 may include a touch screen and/or buttons configured to receive inputs from a vehicle user 11 (FIG. 6). Accordingly, the vehicle controller 34 is configured to receive inputs from the user via the user interface 23 and/or speech/voice inputs through the microphone 31.

The electric vehicle 10 may include one or more displays 29 configured to display information to the user (e.g., vehicle operator or passenger). In certain embodiments, the display 29 may be configured as a head-up display (HUD), and/or an information cluster display. The electric vehicle 10 may additionally include GPU, a security module and one or more connectivity modules.

The software in the electric vehicle 10 may include an operating system and locations services, network connectivity services, power monitor and control, user profiles, charging profiles, and vehicle safety modules. The software in the electric vehicle 10 may include a client compute application (CCA) that checks user preferences for cost thresholds, time duration restrictions (both schedule and artificial intelligence or machine learning based), time of day charge (TODC) restrictions, locations, network bandwidth, and other restrictions to confirm if an incoming task can be processed. The software in the electric vehicle 10 includes a billing module within CCA that negotiates with the remote server 50 for various job sizes based on parameters like available compute power, memory, battery state of charge, available (or projected) idle time, etc. The CCA priorities tasks for scheduling based on user preferences and cost basis. Billing is handled by the billing module, and the billing module communicates with the remote server 50 for cost and payment solutions. The software of the electric vehicle further includes a compute client module (CCM) that authenticates with the remote server 50 and fetches tasks or work units. A work unit is a single job/task that can be scheduled and completed independently by a single CCA. The software of the electric vehicle 10 also includes an authenticator module that verifies that the account, billing, and task transactions are following security measures. Further, the software of the electric vehicle 10 includes a vehicle safety module that ensures tasks are processed only when conditions are met and the electric vehicle 10 is connected to a charge port 39 before high performance computations are processed.

The communication system 36 is in communication with the vehicle controller 34 and is configured to wirelessly communicate information to and from a remote computing system 48, such as a cloud computing system and/or a grid computing system. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or vehicle transceivers 37 for receiving and/or transmitting signals. The vehicle transceivers 37 may be considered sensors 40 or sources of information. The communication system 36 is configured to wirelessly communicate information between the electric vehicle 10 and another vehicle. Further, the communication system 36 is configured to wirelessly communicate information between the electric vehicle 10 and infrastructure or other vehicles.

The electric vehicle 10 further includes a charging port 39 that allows the electric vehicle 10 to be electrically connected to the receive electrical power from a charging infrastructure 58, such as a charging station. In the present disclosure, the term "charging infrastructure" is a piece of equipment that supplies electrical power for charging plug-in electric vehicles 10. The charging port 39 is electrically connected to the battery (or battery pack) 21 of the electric vehicle 10. Accordingly, when the electric vehicle 10 is electrically connected to the charging infrastructure 58, the charging infrastructure 58 may electrically charge the battery (or battery pack) 21 through the charging port 39 of the electric vehicle 10. The charging port 39 is also in communication with the vehicle controller 34. As such, the vehicle controller 34 may send and receive signals from the charging infrastructure 58 through the charging port 39.

The system 98 for using idle computing power of the electric vehicle 10 includes a remote computing system 48, such as a cloud computing system or a grid computing system. The remote computing system may be part of the charging infrastructure 58. The remote computing system 48 includes one or more remote servers 50 that are not physically connected to the electric vehicle 10. Irrespective of the number of remote servers 50, each remote server 50 has a server controller 51 having at least one server processor 52 and at least one server non-transitory computer readable storage device or media 54. The server processor 52 may be a custom-made processor, a central processing unit (CPU), a graphics processing unit (GPU), an auxiliary processor among several processors associated with the server controller 51, a semiconductor-based microprocessor (in the form of a microchip or chip set), a macroprocessor, a combination thereof, or generally a device for executing instructions. The server computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the server processor 44 is powered down. The server computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The server controller 51 of the electric vehicle 10 may be programmed to execute at least part of the methods described in detail below. The remote computing system 48 may include one or more antennas and/or server transceivers 56 for wirelessly receiving and/or transmitting signals. The server transceivers 56 enable the remote computing system 48 to wirelessly communicate information between the electric vehicle 10 and the remote computing system 48 or another entity. The electric vehicle 10 and the remote computing system 48 may also physically/electrically communicate with each other.

The system 98 for using idle computing power of the electric vehicle 10 includes a charging infrastructure 58 configured to supply electrical power to the electric vehicle 10. The charging infrastructure 58 includes a charging plug 60 configured, shaped, and sized to be physically and electrically connected to the charging port 39 of the electric vehicle 10. Thus, the charging plug 60 facilitates an electrical connection between the electric vehicle 10 and the charging infrastructure 58. In addition, the charging plug 60 facilitates signal communication between the vehicle controller 34 and the charging infrastructure 58. The charging infrastructure 58 may be a charging station and includes a station controller 61 in communication with the vehicle controller 34 when the charging infrastructure 58 is electrically connected to the electric vehicle 10. The station controller 61 includes at least one station processor 62 and at least one station non-transitory computer readable storage device or media 64. The station processor 62 may be a custom-made processor, a central processing unit (CPU), a graphics processing unit (GPU), an auxiliary processor among several processors associated with the server controller 51, a semiconductor-based microprocessor (in the form of a microchip or chip set), a macroprocessor, a combination thereof, or generally a device for executing instructions. The station computer readable storage device or media 64 may include volatile and nonvolatile storage in read-only memory (ROM), random-access memory (RAM), and keep-alive memory (KAM), for example. KAM is a persistent or non-volatile memory that may be used to store various operating variables while the station processor 62 is powered down. The station computer-readable storage device or media 64 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The station controller 61 may be programmed to execute at least part of the methods described in detail below. The charging infrastructure 58 may include one or more antennas and/or station transceivers 66 for wirelessly receiving and/or transmitting signals to and from the electric vehicle 10 and/or the remote computing system 48. Therefore, the station transceivers 66 enable the charging infrastructure 58 to wirelessly communicate information between the charging infrastructure 58 and the remote computing system 48 and/or another entity.

The system 98 for using idle computing power of the electric vehicle 10 may include a mobile device 68, such as a smartphone or a mobile tablet. The mobile device 68 includes one or more device controllers 69 for controller the operation of the mobile device 68. The device controller 69 includes at least one device processor 70 and at least one device non-transitory computer readable storage device or media 72. The device processor 70 may be a custom-made processor, a central processing unit (CPU), a graphics processing unit (GPU), an auxiliary processor among several processors associated with the device controller 69, a semiconductor-based microprocessor (in the form of a microchip or chip set), a macroprocessor, a combination thereof, or generally a device for executing instructions. The device computer readable storage device or media 72 may include volatile and nonvolatile storage in read-only memory (ROM), random-access memory (RAM), and keep-alive memory (KAM), for example. KAM is a persistent or non-volatile memory that may be used to store various operating variables while the station processor 62 is powered down. The station computer-readable storage device or media 64 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions. The device controller 69 may be programmed to execute at least part of the methods described in detail below. The mobile device 68 may include one or more antennas and/or device transceivers 74 for wirelessly receiving and/or transmitting signals to and from the electric vehicle 10, the charging infrastructure 58, and/or the remote computing system 48. Therefore, the device transceivers 74 enable the mobile device 68 to wirelessly communicate information between the charging infrastructure 58 and the remote computing system 48 and/or the electric vehicle 10.

Figure 2:
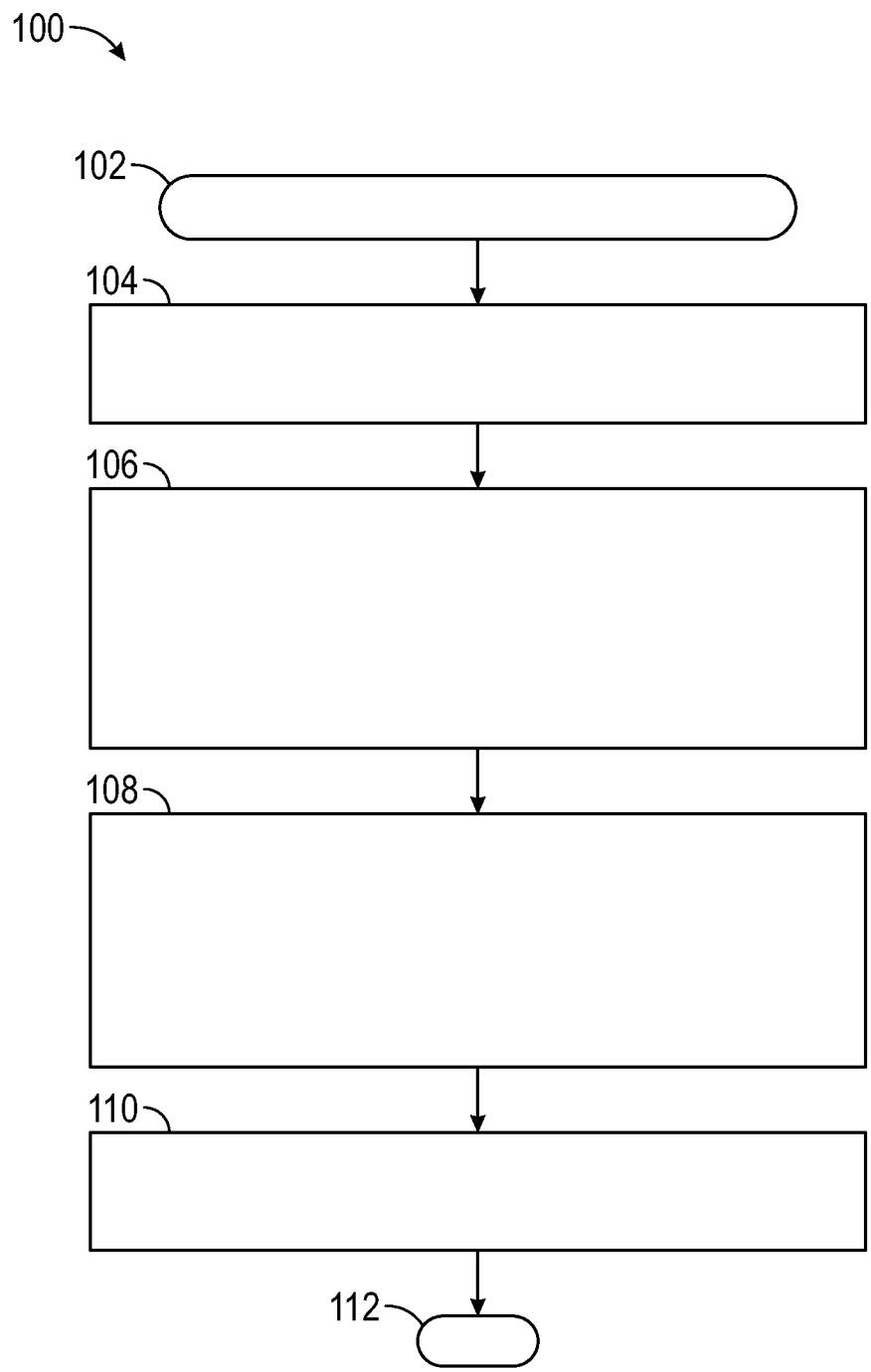
FIG. 2 is a flowchart of a process for configuring the vehicle parameters, wherein this process is part of a method for using idle computing power of the electric vehicle of FIG. 1.

FIG. 2 is a flowchart of a process 100 for configuring vehicle parameters of the electric vehicle 10. The process 100 is part of a method for using idle computing power of the electric vehicle 10. The process 100 begins at block 102 and may be referred to as a user pre-configuration process. Then, the process 100 proceeds to block 104. At block 104, the vehicle operator opens an electric vehicle (EV) configuration user-interface screen in the user interface 23 of the electric vehicle 10, a desktop app (e.g., web app), and/or a mobile app in the mobile device 68. To do so, the vehicle controller 34 commands the user interface 23 of the electric vehicle 10 to open the EV configuration screen in response to receiving an input from the vehicle operator. Alternatively, the device controller 69 commands the mobile device 68 to open the EV configuration screen in response to receiving an input from the vehicle operator. Next, the process 100 proceeds to block 106.

At block 106, the vehicle operator configures the external/commercial parameters through the user interface 23 of the electric vehicle 10 and/or the mobile device 68. The external/commercial parameters are used for charging infrastructures 58 that are external to the vehicle operator's home. As non-limiting examples, the vehicle operator may input and/or configure the desired net profit (e.g., predetermined profit threshold), the available charge time per session (which may be pre-populated from the vehicle profile), and the types of task packets that the electric vehicle 10 supports and the vehicle operator is willing to accept for computations. Then, the process 100 proceeds to block 108.

At block 108, the vehicle operator configures the home profile parameters through the user interface 23 of the electric vehicle 10 and/or the mobile device 68. The home profile parameters are used for charging infrastructures 58 at the vehicle operator's home. As non-limiting examples, the vehicle operator may input and/or configure the desired net profit (e.g., predetermined profit threshold), the available charge time per session, and the types of task packets that the electric vehicle 10 supports and the vehicle operator is willing to accept for computations. Then, the process 100 proceeds to block 110. At block 110, the home profile parameters and the (as configured by the vehicle operator) are saved and the external/commercial parameters on data storage device 32 of the electric vehicle 10 and/or the server storage media 54 of the remote computing system 48. Then, the process 100 continues to block 112. At block 112, the process 100 ends.

Figure 3:
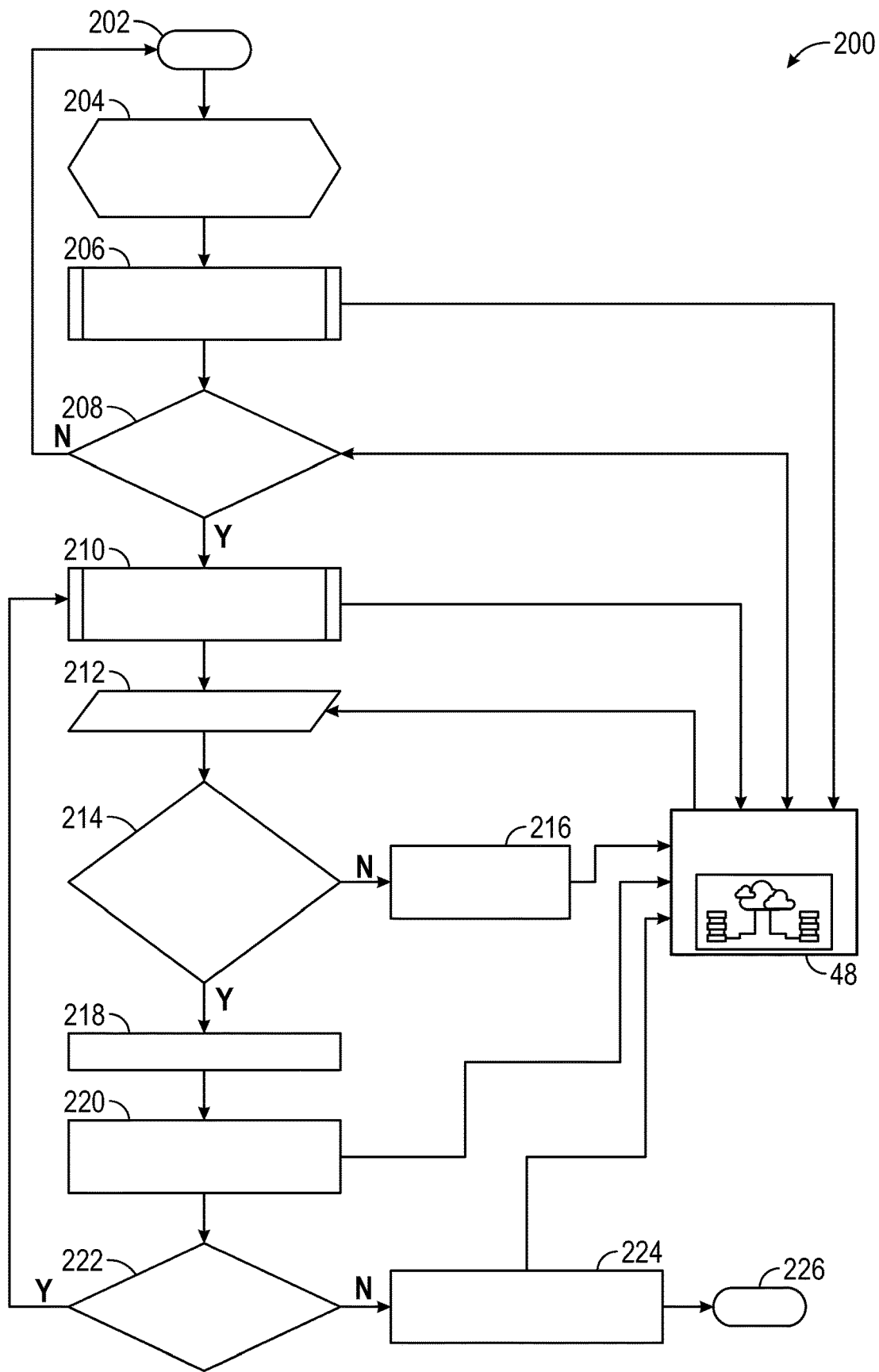
FIG. 3 is a flowchart of a method for using the electric vehicle as a computing node.

FIG. 3 is a method 200 for using the electric vehicle 10 as a computing node in distributed, parallel, edge computing and/or blockchain operations. The method 200 begins at block 202. Then, the method 200 continues to block 204. At block 204, the electric vehicle 10 is parked, charging, and ready to compute. In other words, at block 204, the vehicle controller 34 determines that the electric vehicle 10 is parked based, for example, on the inputs from other components of the electric vehicle 10, such as the sensors 40. Also, at block 204, the vehicle controller 34 determines that the electric vehicle 10 is electrically connected to charging infrastructure 58 and the charging infrastructure 58 currently supplying electrical power to the electric vehicle 10 based on inputs from other components of the electric vehicle 10, such as the charging port 39. Also, at block 204, the vehicle controller 34 determines that it has idle computing power and is therefore ready to make additional computations. Then, the method 200 proceeds to block 206.

At block 206, the vehicle controller 34 of the electric vehicle 10 communicates with the remote computing system 48 for authentication purposes. For example, the vehicle operator may input authentication credentials (e.g., username and password) and such authentication credentials are sent to the remote computing system 48. Then, the remote computing system 48 receives the authentication credentials from the vehicle controller 34. Then, the method 200 proceeds to block 208. At block 208, the remote computing system 48 grants the vehicle controller 34 access to the remote computing system 48 if the authentication credentials match the authentication credentials stored in the remote computing system 48. If the authentication credentials sent by the vehicle controller 34 do not match the authentication credentials stored in the remote computing system 48, then the method 200 returns to block 202. If the authentication credentials sent by the vehicle controller 34 match the authentication credentials stored in the remote computing system 48, then method 200 proceeds to block 210.

At block 210, the vehicle controller 34 determines its computing capacity. In the present disclosure, the term "computing capacity" means the transaction processing capability of a computer or a computer system. According, the computing capacity of the vehicle controller 34 is a transaction processing capacity of the vehicle controller 34. Then, the vehicle controller 34 communicates its computing capacity to the remote computing system 48. Next, the method 200 continues to block 212.

At block 212, the vehicle controller 34 waits and eventually receives one or more computing tasks (i.e., task packets) from one or more remote server 50 of the remote computing system 48 as well as the rates for performing one or more of the computing tasks. In the present disclosure, the term "computing task" means a unit of computing work. Therefore, at block 212, the remote computing system 48 sends one or more tasks (i.e., task packets) to the vehicle controller 34. The vehicle controller 34 may receive the computing tasks from the remote server 50 at the same time as the electric vehicle 10 is electrically connected to the charging infrastructure charging infrastructure 58. In other words, the vehicle controller 34 receives the computing tasks at the same time as the charging infrastructure 58 is supplying electrical power to the electric vehicle 10. Then, the method 200 continues to block 214.

At block 214, the vehicle controller 34 of the electric vehicle 10 determines whether to accept or decline to perform the computing tasks while the electric vehicle 10 is electrically connected to the charging infrastructure 58. In other words, the vehicle controller 34 determines whether to accept or decline to accept to perform the computing tasks received from the remote server 50 at the same time as the charging infrastructure 58 is supplying electrical power to the electric vehicle 10.

To determine whether to accept to perform the computing tasks, the vehicle controller 34 may take into account different considerations depending on whether the charging infrastructure 58 is a commercial site or a home site. For commercial sites, the vehicle controller 34 may consider the net profit, the TODC rates, bidding considerations, charge duration or how long the electric vehicle 10 is available (i.e., guarantee compute time), the charge station availability (guaranteed facility time), and/or other amenities, perks and discounts at the commercial site. For home sites, the vehicle controller 34 may consider the TODC rates (i.e., electricity rates at home) and/or the charge duration or how long the electric vehicle 10 is available (i.e., the guaranteed compute time).

At block 214, the vehicle controller 34 determines whether its computing capacity is sufficient to perform one or more of the computing tasks received from the remote computing system 48 (i.e., one or more remote servers 50). The computing tasks may include, but are not limited to, blockchain transactions, solving complex scientific problems, computation and/or data storage closer to a specific location to improve response time, and/or hosting a virtual machine to handle the vehicle operator's day-to-day tasks. If the computing capacity is not sufficient to perform one or more of the computing tasks, then the vehicle controller 34 declines to perform one or more computing tasks and the method 200 continues to block 216. At block 216, the vehicle controller 34 reports an error to the remote computing system 48 and refrains from performing the computing tasks. The computing tasks from various infrastructure companies may be queued. If the vehicle controller 34 determines that its computing capacity is sufficient to perform one or more computing tasks received from the remote computing system 48, then the vehicle controller 34 accepts to perform the computing tasks and the method 200 may continue to block 218 depending on other considerations. Regarding these other considerations, the vehicle controller 34 may determine whether the rates for performing the computing tasks and the rates for charging the electric vehicle 10, both of which may be received from the remote computing system 48 and/or the charging infrastructure 58. The rates for performing the computing tasks may be referred to as task rates, whereas the rates for charging the electric vehicle 10 may be referred to as charge rates. For instance, at block 214, the vehicle controller 34 may determines (e.g., calculates) the net profit for performing the computing task while electrically charging the electric vehicle 10. To do so, the vehicle controller 34 considers the rates for performing the computing tasks and the rates for electrically charging the electric vehicle 10. For example, the net profit may be determined using the following equations;

$$\text{Cost}_{Overhead} = (C_{devSetup} + C_{Infra} + (C_{elec} \times \text{ToDC}/(60*60))); \text{ and}$$

$$\text{Net Profit}_{(per\ session,\ per\ sec)} = (\text{Revenue}_{EdevEarnPot} - \text{Cost}_{Overhead})$$

where
- $C_{elec}$ is the electricity cost in kilowatts per hour;
- ToDC stands for Time Of Day Charge and is the electricity rate based peak and non-peak rates;
- $C_{devSetup}$ is a device setup fee;
- $C_{infra}$ is an infrastructure fee per second (or charging infrastructure fee per second);
- $\text{Cost}_{Overhead}$ is the cost of charging the electric vehicle 10 per second;
- $\text{Revenue}_{EdevEarnPot}$ is the revenue for computing the tasks received from the received from the remote computing system 48 per second;
- $\text{Net Profit}_{(per\ session,\ per\ sec)}$ is the net profit for computing the tasks per session per second.

After determining the net profit, the vehicle controller 34 compares previously determined net profit with a predetermined profit threshold to determine whether the net profit is greater than a profit threshold. Accordingly, the vehicle controller 34 determines whether the net profit is greater than the predetermined profit threshold. If the net profit is less than the predetermined profit threshold or computing capacity of the vehicle controller 34 is not sufficient to perform one or more of the computing tasks received from the remote computing system 48, then the method 200 continues to block 216. At block 216, the vehicle controller 34 reports an error to the remote computing system 48 and refrains from performing the computing tasks received from the remote server 50. If the net profit is equal to or greater than the predetermined profit threshold and the computing capacity of the vehicle controller 34 is sufficient to perform one or more computing tasks received from the remote computing system 48, then the vehicle controller 34 accepts to perform the computing tasks by sending an acceptance signal to the remote computing systems 48 and the method 200 continues to block 218. The acceptance signal is indicative that the vehicle controller 34 accepted to perform one or more of the computing tasks received from the remote server 50. Upon receiving the acceptance signal, the station controller 61 commands the charging infrastructure 58 to electrically charge (i.e., supply electrical power) to the electric vehicle 10. In response to this command, the charging infrastructure 58 supplies electrical power to the electric vehicle 10. The charging, however, may takes place independent of the computations and, therefore, the vehicle operator may still be billed for the electrical charging of the electric vehicle 10 independent of the computations.

At block 218, the vehicle controller 34 uses its computing power to perform some or all computing tasks received from the remote computing systems 48. Then, the method 200 proceeds to block 220. At block 220, the vehicle controller 34 sends the results of the computing tasks to the remote computing systems 48. Next, the method 200 continues to block 222. At block 222, the vehicle controller 34 determines whether there more computing tasks to perform. If there are more computing tasks to perform, the method 200 returns to block 210. If all computing tasks have been performed, then the method 200 continues to block 224. At block 224, the vehicle controller 34 notifies the remote computing systems 48 either that there has been an error or that the method 200 has reached the end of the cycle. Then, the method 200 continues to block 226. At block 226, the method 200 stops and ends.

Figure 4:
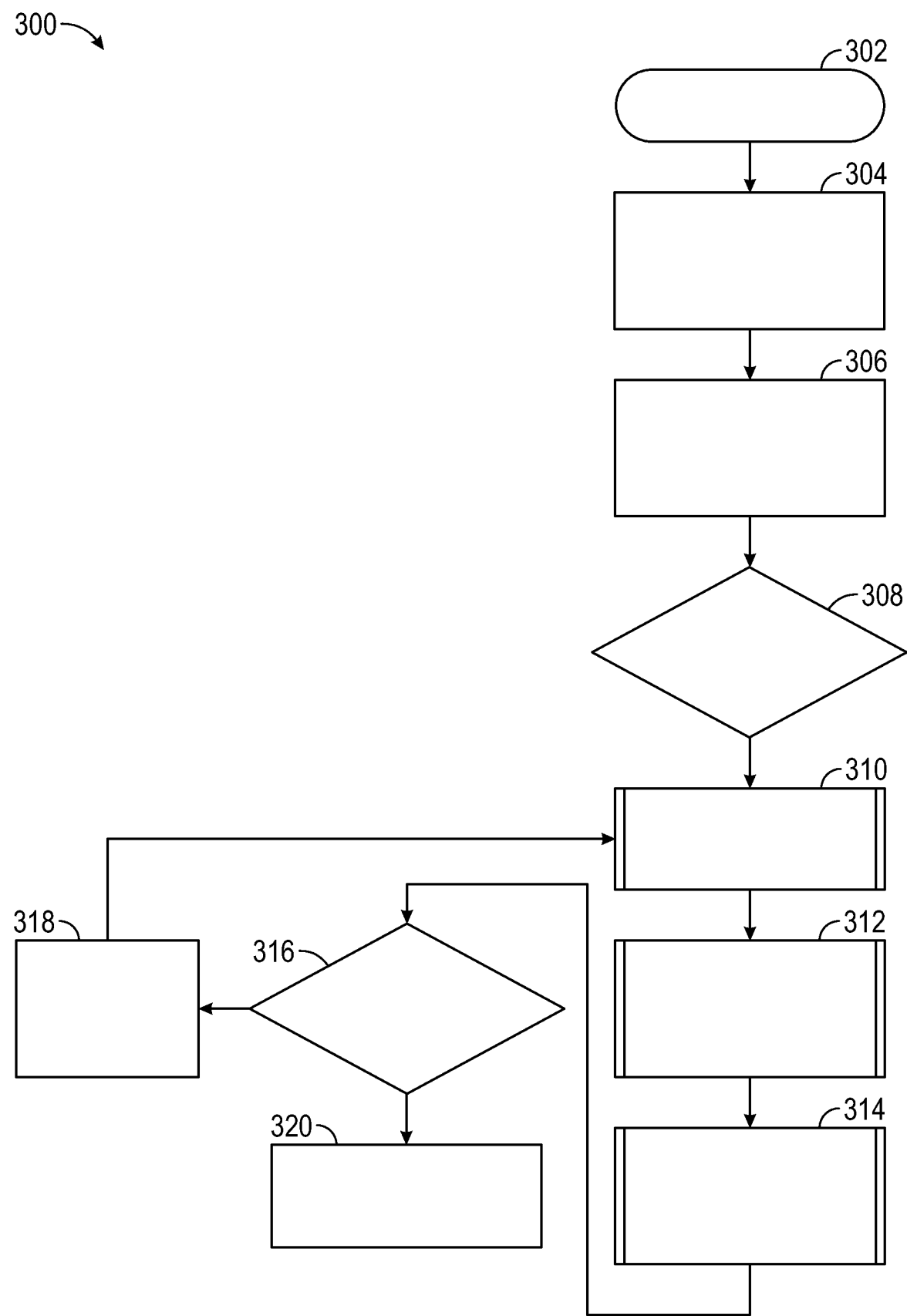
FIG. 4 is a flowchart of a process for using the electric vehicle as a computing node from a vehicle perspective, wherein this process is part of the method for using idle computing power of the electric vehicle of FIG. 3.

FIG. 4 is a flowchart of a process 300 for using the electric vehicle as a computing node from a vehicle perspective. The process 300 is part of the method 200 and starts at block 302. At block 302, the vehicle controller 34 determines whether a vehicle operator is driving the electric vehicle 10 based on one or more inputs from the sensors 40. Then, the process 300 continues to block 402. At block 402, the vehicle controller 34 determines whether the electric vehicle 10 the battery (or battery pack) 21 of the electric vehicle 10 needs to be charged based on the state of charge (SOC) of the battery pack 21. Alternatively, the vehicle controller 34 determines whether the vehicle operator would like to take a break based on inputs from the vehicle operator. Next, the process 300 proceeds to block 304.

At block 304, in response to determining that the battery (or battery pack) 21 of the electric vehicle 10 needs to be charged or that the vehicle operator would like to take a break, the vehicle controller 34 searches for charging infrastructures 58 within a predetermined distance (e.g., two miles) from the electric vehicle 10 or a predetermined place using, for example, inputs from the (GPS) transceivers 45. In response, the vehicle controller 34 commands the user interface 23 of the electric vehicle 10 and/or the mobile device 68 (via the CCA) to display a list of the charging infrastructures 58 that are located within the predetermined distance from the electric vehicle 10. The vehicle controller 34 may also (or alternatively) command the speakers 27 of the electric vehicle 10 to utter a list of the list of the charging infrastructures 58 that are located within the predetermined distance from the electric vehicle 10. The process 300 then proceeds to block 308.

At block 308, the vehicle controller 34 receives the task rate for performing the computing tasks for each of the plurality of charging infrastructures 58 that are located within the predetermined distance from the electric vehicle 10. The vehicle controller 34 also receives the charging rate for charging the electric vehicle 10 for each of the plurality of charging infrastructures 58 that are located within the predetermined distance from the electric vehicle 10. The vehicle controller 34 then determines the net profit for each of the plurality of charging infrastructures 58 that are located within the predetermined distance from the electric vehicle 10 using the task rate for performing the computing tasks for each of the plurality of charging infrastructures 58 that are located within the predetermined distance from the electric vehicle 10 and the charging rate for charging the electric vehicle 10 for each of the plurality of charging infrastructures 58 that are located within the predetermined distance from the electric vehicle 10. Also, at block 308, the vehicle controller 34 compares the net profit for each of the plurality of charging infrastructures 58 that are located within the predetermined distance from the electric vehicle 10 with a predetermined profit threshold to determine whether the net profit for each of the plurality of charging infrastructures 58 that are located within the predetermined distance from the electric vehicle 10 is equal to or greater than the predetermined profit threshold to determine the profitable charging infrastructures. The profitable charging infrastructures 58 are the charging infrastructures 58 that are located within the predetermined distance from the electric vehicle 10 and have a net profit is equal to or greater than the predetermined profit threshold. At block 308, the vehicle controller 34 also determines whether the charging infrastructures 58 complies with any other criteria preconfigured by the vehicle operator. For example, the vehicle controller 34 may determine whether its computing capacity is sufficient to perform the computing tasks required by the profitable charging infrastructures 58. After determining the profitable charging infrastructures 58, the process 300 continues to block 310.

At block 310, the vehicle controller 34 commands the user interface 23 and/or the mobile device 68 to display a list of the profitable charging infrastructures 58 that match the criteria preconfigured by the vehicle operator. In response to receiving the command from the vehicle controller 34, the user interface 23 and/or the mobile device 68 may also display the charging rates and the task rates for each of the profitable charging infrastructures 58. The user interface 23 may also have criteria to filter, sort, and/or list based on user commands. The process 300 may then continue to block 312.

At block 312, the vehicle operator selects one of the profitable charging infrastructures 58 (i.e., the selected charging infrastructure) using the user interface 23 and/or the mobile device 68. Accordingly, the vehicle controller 34 receives the selection made by the vehicle operator of one of the profitable charging infrastructures 58. The process 300 then proceeds to block 314.

At block 314, the remote server 50 of the remote computing system 48 negotiates (e.g., sends) the vehicle controller 34 the task rates and the charging rates for the selected charging infrastructure along with parking slot preferences for the selected charging infrastructure 58. Then, the process 300 proceeds to block 316.

At block 316, the vehicle operator or the vehicle controller 34 accepts or declines the offer (including the charging rates and the task rates) from the selected charging infrastructure 58. If the vehicle operator or the vehicle controller 34 declines the offer from the selected charging infrastructure, then the process 300 continues to block 318. At block 318, the vehicle controller 34 displays an error and then the process 300 returns to block 310. If the vehicle operator or the vehicle controller 34 accepts the offer from the selected charging infrastructure 58, then the process 300 proceeds to block 320.

At block 320, the selected charging infrastructure 58 electrically charges the electric vehicle 10 at the same time that the vehicle controller 34 performs the computing tasks received from the remote server 50 of the remote computing system 48. The vehicle controller 34 may receive the computing tasks through the charging plug 60 of the selected charging infrastructure 58 and/or wirelessly from the remote server 50 of the remote computing system 48 while the electric vehicle 10 is electrically connected to the selected charging infrastructure 58. At block 318, the vehicle controller 34 may also report the results of performing the computing tasks to the remote server 50 of the remote computing system 48.

Figure 5:
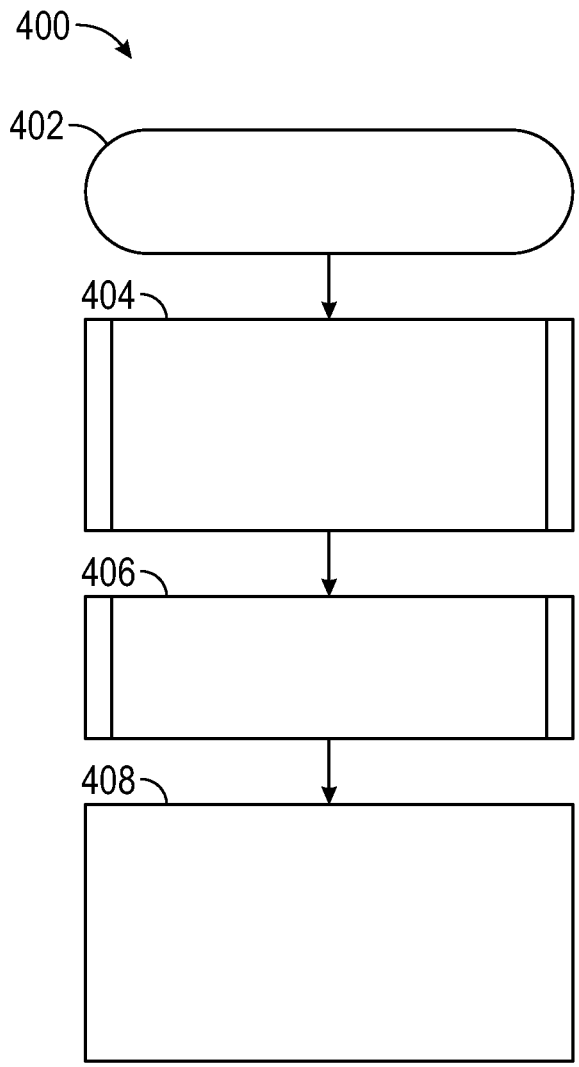
FIG. 5 is a flowchart of a process for using the electric vehicle as a computing node from the perspective of the charging infrastructure, wherein this process is part of the method for using idle computing power of the electric vehicle of FIG. 3.

FIG. 5 is a flowchart of a process 400 for using the electric vehicle as a computing node from the perspective of the charging infrastructure. The process 400 begins at block 402. At block 402, the station controller 61 determines whether the charging infrastructure 58 is ready to electrically charge the electric vehicle 10. Then, the process 400 continues to block 404. At block 404, the station controller 61 connects to the remote computing system 48 using the station transceivers 66 and receives the computing tasks as well as the tasks rates for performing the computing tasks from one or more remote servers 50. Then, the process 400 continues to block 406.

At block 406, the station controller 61 sends (i.e., communicates) the tasks rates for performing the computing tasks and the charge rates for charging the electric vehicle 10 to one or more electric vehicle 10. Next, the process 400 proceeds to block 408.

At block 408, the station controller 61 sends one or more advertisements to the vehicle controller 34. The advertisements include, but are not limited, discount, promotions, and seasonal adjustments to the charge rates for charging the electric vehicle 10. For example, the advertisement may be discount for charging the electric vehicle 10 in exchange for performing the computing tasks received from the remote computing system 48.

FIG. 6 is a flowchart of a process 500 for using the electric vehicle as a computing node from the perspective of the remote computing system 48. The process 500 begins at block 502. At block 502, the server controller 51 of the remote server 50 determines whether the remote computing system 48 is ready. In response to the determining that the remote computing system 48 is ready, the process 500 continues to block 504.

At block 504, one or more remote servers 50 creates task packets, a scheduler, an authenticator, and billing processes. The track packets are a list of computing tasks that should be performed. The scheduler schedules the order and/or time that the computing tasks should be performed. The authenticator allows a vehicle operator to access the remote computing system 48 using authentication credentials. The billing processes allow the remote computing system 48 to bill the vehicle operator for charging the electric vehicle 10 taking into accounts discounts for performing the computing tasks. The process 500 then proceeds to block 506.

At block 506, the remote computing systems 48 uses the server transceivers 56 to send the tasks packets (including the computing tasks including their types) and the task rates for performing the computing tasks to the relevant stakeholders (e.g., vehicle controller 34 of the electric vehicle 10, mobile device 68, and/or the station processor 62 of the charging infrastructure 58). Then, the process 500 continues to block 508. At block 508, the remote computing system 48 schedules the performance of the computing tasks by the vehicle controller 34. Next, the process 500 continues to block 510.

At block 510, the remote computing system 48 receives the results of the performance of the computing tasks by the vehicle controller 34 after sending the task packets to the vehicle controller 34. As discussed above, the vehicle controller 34 performs the computing tasks at the same time as the charging infrastructure 58 electrically charges the electric vehicle 10. Also, at block 510, the remote computing system 48 validates the results of the performance of the computing tasks. Then, the process 500 continues to block 512.

At block 512, the remote computing system 48 updates the billing for electrically charging the electric vehicle 10 based on the fact that the vehicle controller 34 performed the computing tasks. Thus, at block 512, the remote computing system 48 bills the vehicle operator of the electric vehicle 10 for electrically charging the electric vehicle 10 while providing a discount for using the idle computing power of the vehicle controller 34 to perform the computing tasks. The process 500 then continues to block 514.

At block 514, the remote computing system 48 determines whether the computing tasks have been performed by the vehicle controller 34. In response to the determining that the computing tasks have been performed by the vehicle controller 34, the remote computing system 48 flushes and purges the computing tasks that have been performed by the vehicle controller 34.

Figure 7A:
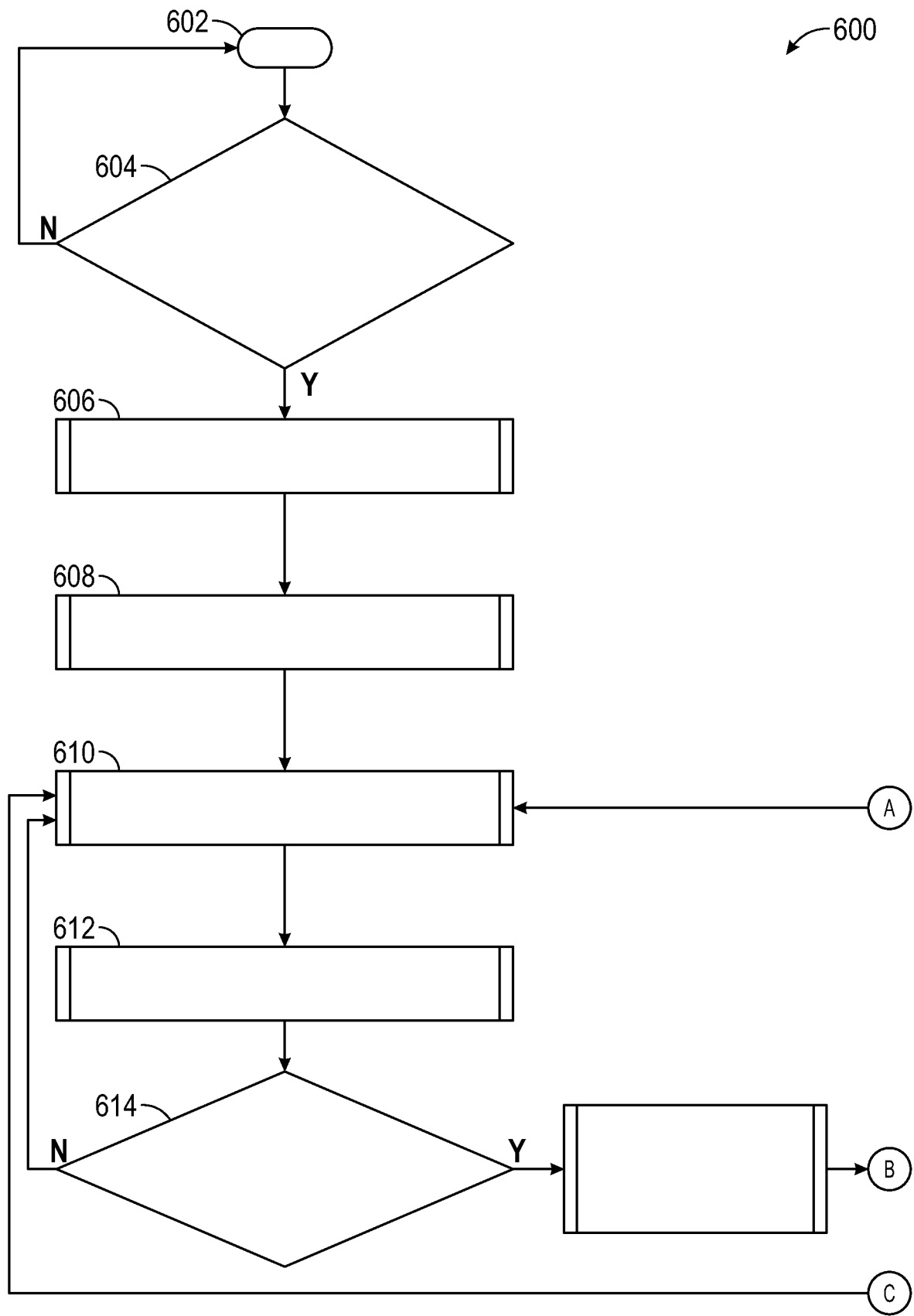
FIG. 7A is a part of a flowchart for a method for using the electric vehicle as a computing node according to an embodiment of the present disclosure.
Figure 7B:
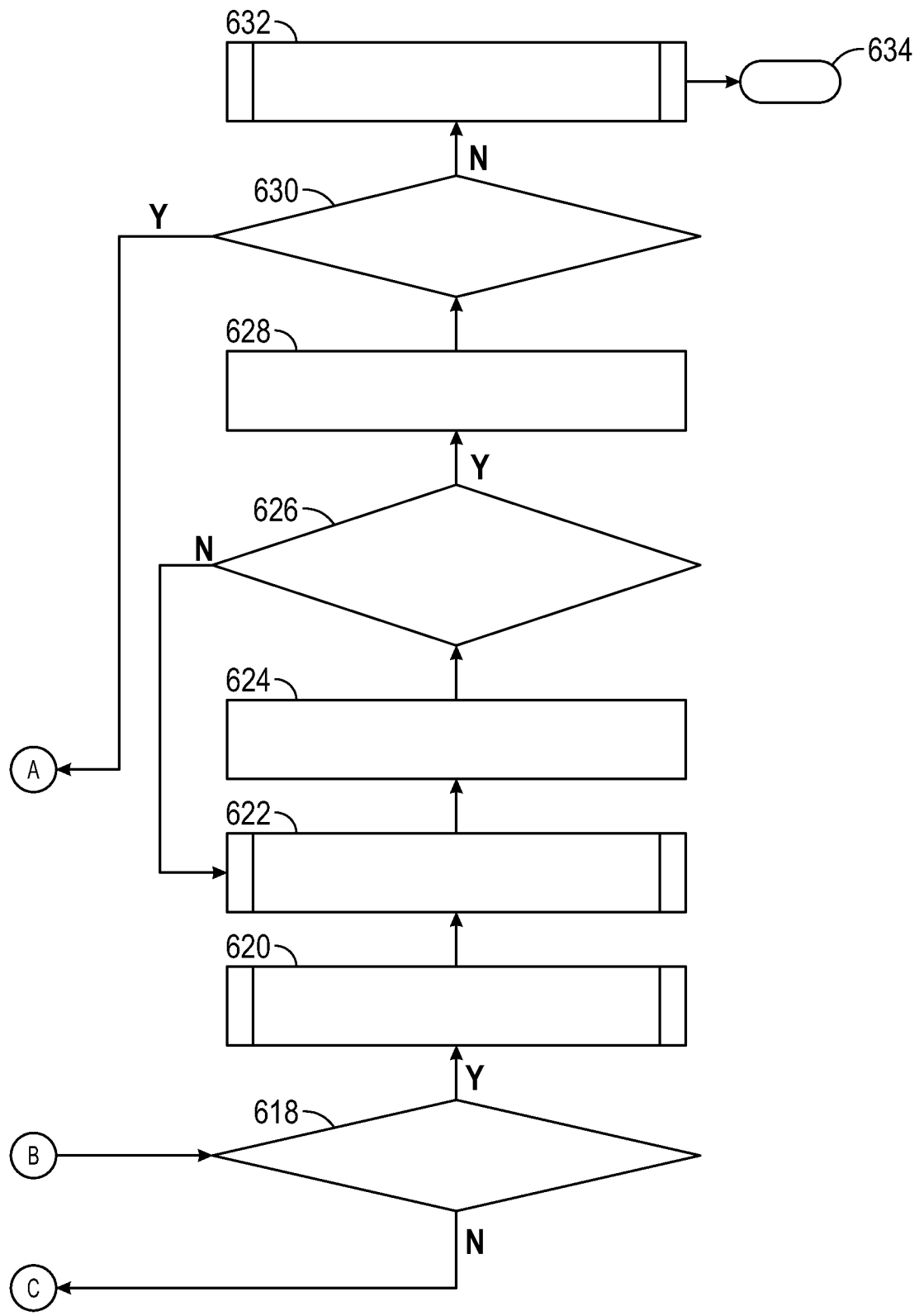
FIG. 7B is another part of the flowchart of FIG. 7A.

FIG. 7 is a flowchart for a method 600 for using the electric vehicle 10 as a computing node according to an embodiment of the present disclosure. The method 600 begins at block 602. Then, the method 600 proceeds to block 604. At block 602, the vehicle controller 34 determines whether the electric vehicle 10 is parked, is connected to the charge plug 60 of the charging infrastructure 58 and has network connectivity. If the electric vehicle 10 is not parked, is not connected to the charge plug 60 or does not have network connectivity, then the method 600 returns to block 602. If the electric vehicle 10 is parked, is connected to the charge plug 60 of the charging infrastructure 58 and has network connectivity, then method 600 continues to block 606.

Block 606 entails authenticating the electric vehicle 10 with the charging infrastructure 58 and the remote computing system 48. If the authentication is successful, the method 600 proceeds to block 608. At block 608, the vehicle controller 34 request the charging information from the charging infrastructure 58. Then, the method 600 continues to block 610. In response to this request, the charging infrastructure 58 sends the charging information to the vehicle controller 34. After receiving the charging information from the charging infrastructure 58, the method 600 continues to block 612.

At block 612, the vehicle controller 34 requests the computing task information from the remote servers 50 of the remote computing system 48. The computing task information includes contract terms for performing the computing tasks. Upon receipt of the computing task information from the remote servers 50, the method 600 continues to block 614.

At block 614, the vehicle operator of the electric vehicle 10 accepts or declines the contract terms for performing the computing tasks or the vehicle controller 34 determines whether the contract terms match the preset configuration thresholds. If the vehicle operator declines the contract terms or the vehicle controller 34 determines that the contract terms do not match the present configuration threshold, then the method 600 returns to block 610. If the vehicle operator accepts the contract terms or the contract terms match the preset configuration thresholds, then the method 600 continues to block 616. At block 616, the vehicle controller 34 negotiates the contract with the charging infrastructure 58 and the remote computing system 48. Then, the method 600 continues to block 618.

At block 618, the remote computing system 48 determines whether the contract has been accepted. If the contract has not been accepted, the method 600 returns to block 610. If the contract has been accepted, the method 600 continues to block 620. At block 620, the vehicle controller 34 requests one or more tasks from the remote computing system 48. Upon receipt of the tasks by the vehicle controller 34, the method 600 proceeds to block 622.

At block 622, the vehicle controller 34 processes one or more tasks received from the remote computing system 48. After the tasks have been completed, the method 600 proceeds to block 624. The vehicle controller 34 sends the updated results of the computing tasks to the remote computing system 48. Then, the method 600 continues to block 626. At block 626, the remoting computing system 48 may accept or decline the results of the performance of the computing tasks. If the remote computing system 48 declines the results, then the method 600 returns to block 622 and the computing task may be retried. If the remote computing system 48 accepts the results, then the method 600 continues to block 628. At block 628, the remote computing system 48 updates the billing. After the billing has been updated, the method 600 continues to block 630. At block 630, the remote computing system 48 determines whether more computations are needed. If more computations are needed, then the method 600 returns to block 610. If no more computations are needed, then the method 600 continues to block 632. At block 632, the computing tasks are purged. Then, the method 600 continues to block 634. At block 634, the method 600 ends.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components and communications protocols of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for using idle computing power of an electric vehicle, comprising:
   determining, by a vehicle controller of the electric vehicle, whether the electric vehicle is in motion;
   in response to determining that the electric vehicle is in motion, searching for a plurality of charging infrastructures that are located within a predetermined distance from the electric vehicle while the electric vehicle is in motion;
   determining that the vehicle controller of the electric vehicle has idling computing power;
   in response to determining that the vehicle controller of the electric vehicle has idling computing power, receiving, by the vehicle controller, task rates for performing computing tasks from each of the plurality of charging infrastructures that is located within the predetermined distance from the electric vehicle;
   selecting one of the plurality of charging infrastructures to determine a selected charging infrastructure;
   in response to selecting one of the plurality of charging infrastructures, sending, by the vehicle controller, an acceptance signal to a remote server, wherein the acceptance signal is indicative that the vehicle controller accepted to perform the computing tasks at the selected charging infrastructure; and
   in response to receiving the acceptance signal from the vehicle controller, commanding the selected charging infrastructure to supply electrical power the electric vehicle while the vehicle controller performs the computing tasks once the electric vehicle is electrically connected to the selected charging infrastructure.

2. The method of claim 1, wherein the vehicle controller sends the acceptance signal to a station controller of the charging infrastructure based on the task rates for performing the computing tasks.

3. The method of claim 1, further comprising communicating charge rates for electrically charging the vehicle controller to the vehicle controller.

4. The method of claim 3, further comprising communicating advertisements to the vehicle controller, wherein the advertisements include at least one chosen from discounts, promotions, and seasonal adjustments.

5. The method of claim 4, wherein the discounts include charge rate discounts in exchange for using the idle computing power of the vehicle controller, wherein the predetermined distance is two miles, and the method further comprises:
   in response to determining that the electric vehicle is in motion, determining that a battery of the electric vehicle needs to be charged based on a state of charge of the battery while the electric vehicle is in motion;
   in response to determining that the battery of the electric vehicle needs to be charged, receiving charging rates for charging the electric vehicle from each of the plurality of charging infrastructures that is located within the predetermined distance from the electric vehicle;
   in response to receiving the task rates for performing the computing task and the charging rates for charging the electric vehicle, determining a net profit for each of the plurality of charging infrastructure that is located within the predetermined distance from the electric vehicle using the task rates for performing the computing tasks and the charging rates for charging the electric vehicle;
   comparing the net profit of each of the plurality of charging infrastructures with a predetermined profit threshold to determine whether the net profit of each of the plurality of charging infrastructures is equal to or greater than the predetermined profit threshold, thereby determining at least one profitable charging infrastructure, wherein the net profit of the at least one profitable charging infrastructure is equal to or greater than the predetermined profit threshold; and
   selecting the at least one profitable charging infrastructure to determine the selected charging infrastructure.

6. A method for using idle computing power of an electric vehicle, comprising:
   creating task packets, wherein each of the task packets includes a plurality of computing tasks and corresponding task rates for each of the plurality of computing tasks;
   determining, by a vehicle controller of the electric vehicle, whether the electric vehicle is in motion;
   in response to determining that the electric vehicle is in motion, searching for a plurality of charging infrastructures that are located within a predetermined distance from the electric vehicle while the electric vehicle is in motion;
   determining that the vehicle controller of the electric vehicle has idling computing power;
   selecting one of the plurality of charging infrastructures to determine a selected charging infrastructure;
   sending the computing tasks to the vehicle controller of the electric vehicle; and
   in response to sending the computing tasks to the vehicle controller of the electric vehicle, receiving results of a performance of the computing tasks by the vehicle controller while a charging infrastructure supplies electrical power to the electric vehicle.

7. The method of claim 6, further comprising billing a vehicle operator of the electric vehicle for supplying electrical power to the electric vehicle while providing a discount for using a computing power of the vehicle controller to perform the computing tasks.

8. The method of claim 7, further comprising scheduling the performance of the computing tasks by the vehicle controller.

9. The method of claim 8, further comprising:
   determining that the computing tasks of at least one of the task packets have been completed by the vehicle controller; and
   purging the computing tasks that have been completed from the task packets.

10. The method of claim 5, wherein the method comprises receiving results of the performance of the computing tasks, and the net profit is calculated with the following equations:

$$\text{Cost}_{Overhead} = (C_{devSetup} + C_{Infra} + (C_{elec} \times \text{ToDC}/(60*60))); \text{ and}$$

$$\text{Net Profit}_{(per\ session,\ per\ sec)} = (\text{Revenue}_{EdevEarnPot} - \text{Cost}_{Overhead})$$

where
$C_{elec}$ is the electricity cost in kilowatts per hour;
ToDC stands for Time Of Day Charge and is the electricity;
$C_{devSetup}$ is a device setup fee;
$C_{infra}$ is an infrastructure fee per second;

$\text{Cost}_{Overhead}$ is the cost of charging the electric vehicle 10 per second;

$\text{Revenue}_{EdevEarnPot}$ is the revenue for performing the computing tasks per second; and Net $\text{Profit}_{(per\ session,\ per\ sec)}$ is the net profit for computing the tasks per session per second.

11. A system for using idle computing power of an electric vehicle, comprising:

a charging infrastructure including a station controller, wherein the station controller is programmed to:

receive computing tasks from a remote server;

send the computing tasks to a vehicle controller of the electric vehicle;

receive an acceptance signal from the vehicle controller, wherein the acceptance signal is indicative that the vehicle controller accepted to perform the computing tasks; and in response to receiving the acceptance signal from the vehicle controller, command the charging infrastructure to supply electrical power to the electric vehicle while the vehicle controller performs the computing tasks;

wherein the electric vehicle includes a vehicle controller, and the vehicle controller is programmed to:

determine whether the electric vehicle is in motion;

in response to determining that the electric vehicle is in motion, search for a plurality of charging infrastructures that are located within a predetermined distance from the electric vehicle while the electric vehicle is in motion;

determine that the vehicle controller of the electric vehicle has idling computing power;

in response to determining that the vehicle controller of the electric vehicle has idling computing power, receive a plurality of task rates for performing the computing tasks from each of the plurality of charging infrastructures that is located within the predetermined distance from the electric vehicle;

select one of the plurality of charging infrastructures to determine a selected charging infrastructure;

in response to selecting one of the plurality of charging infrastructures, send the acceptance signal to the remote server, wherein the acceptance signal is indicative that the vehicle controller accepted to perform the computing tasks at the selected charging infrastructure; and in response to receiving the acceptance signal from the vehicle controller, command the selected charging infrastructure to supply electrical power the electric vehicle while the vehicle controller performs the computing tasks once the electric vehicle is electrically connected to the selected charging infrastructure.

12. The system of claim 11, wherein the station controller is programmed to receive task rates for performing the computing tasks from the remote server, and the vehicle controller is programmed to send the acceptance signal to the station controller of the charging infrastructure based on the task rates for performing the computing tasks.

13. The system of claim 11, wherein the station controller is programmed to communicate charge rates for electrically charging the vehicle controller to the vehicle controller.

14. The system of claim 13, wherein the station controller is programmed to communicate advertisements to the vehicle controller, wherein the advertisements include at least one chosen from discounts, promotions, and seasonal adjustments.

15. The system of claim 14, wherein the discounts include charge rate discounts in exchange for using the idle computing power of the vehicle controller.

16. The system of claim 15, further comprising the remote server, wherein the remote server includes a server controller, and the server controller is programmed to:

create task packets, wherein each of the task packets includes computing tasks and corresponding task rates for each of the computing tasks;

send the computing tasks to the vehicle controller of the electric vehicle; and in response to sending the computing tasks to the vehicle controller of the electric vehicle, receive results of a performance of the computing tasks by the vehicle controller while the charging station supplies electrical power to the electric vehicle.

17. The system of claim 16, wherein the server controller is programmed to bill a vehicle operator of the electric vehicle for electrically charging the electric vehicle while providing a discount for using a computing power of the vehicle controller to perform the computing tasks.

18. The system of claim 17, wherein the server controller is programmed to schedule the performance of the computing tasks by the vehicle controller.

19. The system of claim 18, wherein the server controller is programmed to:

determine that the computing tasks of at least one of the task packets have been completed by the vehicle controller; and purge the computing tasks that have been completed from the task packets.

20. The system of claim 11, wherein the remote server wirelessly sends the computing tasks to the vehicle controller and receives results of the performance of the computing tasks by the vehicle controller.

* * * * *